Patented Mar. 24, 1931

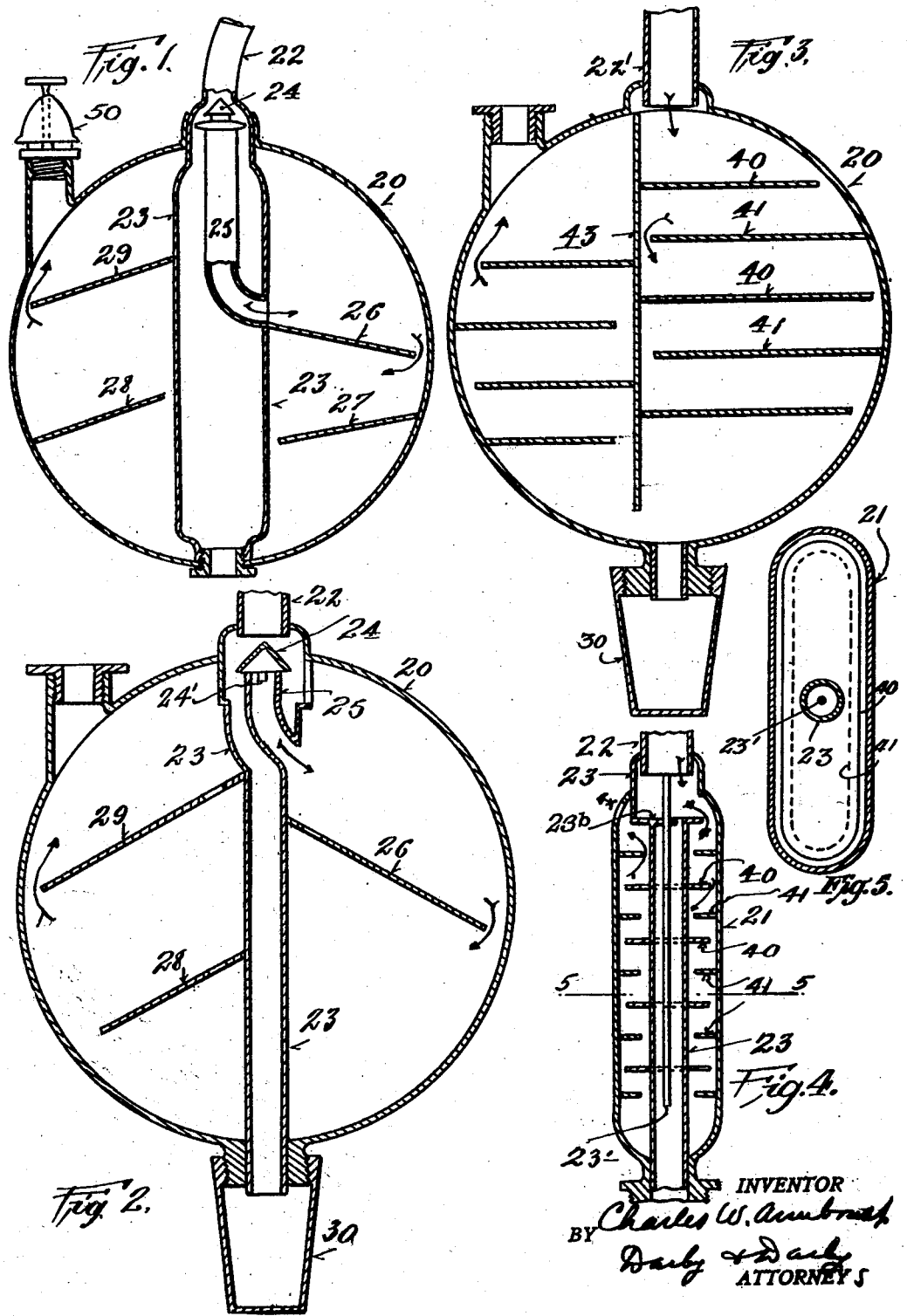

1,797,894

UNITED STATES PATENT OFFICE

CHARLES W. ARMBRUST, OF MIDDLETOWN, NEW YORK, ASSIGNOR TO INTERNATIONAL LIFE SAVING WATER MAKING CUP CORPORATION, OF WASHINGTON, DISTRICT OF COLUMBIA, A CORPORATION OF DELAWARE

CONDENSING AND WATER-COLLECTING DEVICE

Application filed September 25, 1926. Serial No. 137,807.

This invention relates to devices for condensing the moisture from exhaled breath, and has for its object the provision of a life-saving cup which will collect the moisture from the breath and condense it as pure water for and during emergency, as in shipwreck, or on the sea, or in desert places, without fresh water.

A further object of my invention includes the provision of means for efficiency condensing the moisture with best results, and with comparatively simple means.

Other objects will appear hereinafter, and I obtain these objects by the construction shown in the accompanying drawing, in which.

Fig. 1 shows a preferred form of construction of a device which embodies the principles of my invention.

Fig. 2 is a view in section, showing a different arrangement of the parts.

Fig. 3 is a view in section, of a slightly modified form.

Fig. 4 is a similar view of a still different form, and

Fig. 5 is a sectional view taken on the line 5—5 of Fig. 4.

The same numerals refer to like parts throughout the several views.

It is the prime object of my invention to provide an efficient and simple water conserving device which can be carried on board of sea going vessels as a part of the life saving equipment, and whereby persons shipwrecked or afloat on the sea or in desert places without fresh water, can supply themselves with a limited quantity of pure condensed water from the exhaled breath. To this end I provide a cup or vessel 20 or 21, of proper shape and size, as round and flat, or flat and oblong, to be easily carried in a life belt or in the pocket.

The vessel is constructed of suitable material, as non-corroding metal or the like, and is provided with suitable mouth piece connection (not shown) on the inflow tube 22 for respiring into the vessel and with baffles for causing the breath to be deprived of all moisture in passing through said vessel.

Connected with the inflow tube 22, is the saliva collecting tube 23, which, in the form shown in Figs. 1 and 2, is provided with saliva deflecting means 24, at the entrance of the breath conducting tube 25. The breath conducting tube has breath inlets 24' and communicates with the condensing chamber of the cup. In passing through the cup and to the valve in the manner described in my copending application Serial No. 137,806 of even date herewith, the moisture laden breath strikes the baffles 26, 27, 28, and 29, which in Fig. 1 are staggered and alternately attached to the saliva tube and the wall of the cup, thereby causing complete condensation of moisture. The sloping disposition of the baffles in Figs. 1 and 2 aid in collecting the condensed water. The saliva collects in cup 30.

In Figs. 3 and 4, I have shown horizontal baffle plates 40 and 41, arranged in staggered relation, and attached alternately to the wall of the cup and to the partition 43 (Fig. 3) or the saliva collecting tube 23, with saliva guide 23' which is held by a bracket 23b (Fig. 4). It will be noted that the construction of Fig. 3 is not provided with a saliva tube and that the inflow tube 22' opens into the vessel at one side of partition 43. The horizontal arrangement gives more time for condensation, and while slower in action, is more thorough than the sloping type. In the forms shown, which are to be regarded as types, and not specifically, I have endeavored to illustrate what I believe is the underlying principle whereby I obtain pure palatable water from exhaled breath. The water thus collected is used by the person who collects it, and is sufficient to sustain life without the agonizing pangs of thirst in times of greatest need.

The cups are provided with escapement devices or valves, 50, forms of which are described and claimed in my copending application above named.

Having now described my invention, what I claim as new and useful, and desire to secure by Letters Patent is:

1. A condensing and water collecting device for obtaining potable water from exhaled breath, comprising a main cup and an auxiliary cup, a tube extending through said main cup and ending in said auxiliary cup, and a saliva deflector whereby saliva is deflected and separated from the exhaled breath and collected in said auxiliary cup.

2. A condensing and water collecting device for obtaining potable water from exhaled breath, comprising a main cup and an auxiliary cup a tube extending through said main cup and ending in said auxiliary cup and means in said main cup for separating moisture from the exhaled breath.

3. A condensing and water collecting device for obtaining potable water from exhaled breath, comprising a main cup and an auxiliary cup a tube extending through said main cup and a saliva guide carried by said tube, said tube ending in said auxiliary cup and means in said main cup for condensing and collecting moisture contained in said exhaled breath.

4. In a moisture condensing and water collecting device, a container provided with inlet tube and outlet tube, a support centrally disposed in the container, plates alternately supported from the central support and the container walls, and a cup for collecting saliva attached to the outside of the container.

In testimony whereof I have hereunto set my hand on this 22nd day of September, A. D. 1926.

CHARLES W. ARMBRUST.